United States Patent
Kolari et al.

(10) Patent No.: US 10,912,296 B2
(45) Date of Patent: Feb. 9, 2021

(54) BIOCIDE FORMULATION AND METHOD FOR TREATING WATER

(71) Applicant: KEMIRA OYJ, Helsinki (FI)

(72) Inventors: Marko Kolari, Vantaa (FI); Jukka Rautiainen, Espoo (FI); Hans-Peter Hentze, VTT (FI); Hanna-Leena Alakomi, VTT (FI); Pirkko Forssell, VTT (FI)

(73) Assignee: Kemira Oyj, Helsinki (FI)

( * ) Notice: Subject to any disclaimer, the term of this patent is extended or adjusted under 35 U.S.C. 154(b) by 692 days.

(21) Appl. No.: 14/762,494

(22) PCT Filed: Mar. 25, 2014

(86) PCT No.: PCT/FI2014/050216
§ 371 (c)(1),
(2) Date: Jul. 22, 2015

(87) PCT Pub. No.: WO2014/154946
PCT Pub. Date: Oct. 2, 2014

(65) Prior Publication Data
US 2015/0351389 A1    Dec. 10, 2015

(30) Foreign Application Priority Data

Mar. 25, 2013   (FI) .................................... 20135287

(51) Int. Cl.
*A01N 37/34* (2006.01)
*A01N 25/04* (2006.01)
(Continued)

(52) U.S. Cl.
CPC ............. *A01N 37/34* (2013.01); *A01N 25/04* (2013.01); *C02F 1/50* (2013.01); *C02F 2303/04* (2013.01);
(Continued)

(58) Field of Classification Search
None
See application file for complete search history.

(56) References Cited

U.S. PATENT DOCUMENTS 5,312,841 A * 5/1994 Paterson ................. A01N 41/10
514/642
6,096,225 A   8/2000 Yang et al.
(Continued)

FOREIGN PATENT DOCUMENTS

CN    1836508 A  *  9/2006
JP    2861951 B2    3/1999
(Continued)

OTHER PUBLICATIONS

Friberg et al. ("Micelles, microemulsions, liquid crystals, and the structure of stratum corneum lipids", J. Soc. Cosmet. Chem., 1990, 41, 155-171). (Year: 1990).*
(Continued)

*Primary Examiner* — Clare M Perrin
(74) *Attorney, Agent, or Firm* — Berggren LLP (57) ABSTRACT

The present invention provides a biocide formulation comprising a biocide in a micelle, wherein the micelle comprises a block copolymer having a biocide-solubilizing part and a water-soluble part, and a quaternary ammonium stabilizing compound. The present invention also provides a method for controlling microorganisms by eliminating and/or preventing biofilm formation in an aqueous environment.

12 Claims, 2 Drawing Sheets

(51) Int. Cl.
  *C02F 1/50* (2006.01)
  *A01N 25/10* (2006.01)
  *A01N 25/30* (2006.01)
  *A01N 33/12* (2006.01)

(52) U.S. Cl.
  CPC ...... *C02F 2303/20* (2013.01); *C02F 2305/04* (2013.01)

(56) References Cited

U.S. PATENT DOCUMENTS

| | | | |
|---|---|---|---|
| 6,429,181 | B2 | 8/2002 | Sweeny et al. |
| 7,285,224 | B2 | 10/2007 | Barak |
| 2002/0090349 | A1 | 7/2002 | Bergeron et al. |
| 2008/0096763 | A1* | 4/2008 | Dawson ................. A01N 25/30 504/206 |
| 2011/0028525 | A1* | 2/2011 | Diehl .................... A01N 43/80 514/373 |
| 2011/0060052 | A1 | 3/2011 | Martin |
| 2012/0225783 | A1* | 9/2012 | Harris ................... A01N 25/02 504/358 |

FOREIGN PATENT DOCUMENTS

| | | |
|---|---|---|
| JP | 2005035900 A | 2/2005 |
| WO | 2010/107533 A1 | 9/2010 |
| WO | 2012/051204 A2 | 4/2012 |
| WO | 2013/007811 A1 | 1/2013 |

OTHER PUBLICATIONS

Garavito et al. ("Detergents as Tools in Membrane Biochemistry", Journal of Biological Chemistry, 2001, 276, 32403-32406). (Year: 2001).*
Machine translation of CN-1836508A, pp. 1-5. (Year: 2006).*
State Intellectual Property Office, P.R.China, First office action of Chinese application 201480018371.0; dated Sep. 21, 2016.
Finnish Patent and Registration Office, Search Report, Patent Application No. 20135287, dated Feb. 13, 2014.
International Search Report, Application No. PCT/FI2014/050216, dated Jul. 16, 2014.
Written Opinion of the International Searching Authority for International Application No. PCT/FI2014/050216.
State Intellectual Property Office, P.R. China, Second Office Action issued in appln. No. 201480018371.0, dated Jun. 30, 2017.
CHO Effect of Nanoencapusulated Vitamin B1 Derivative on Inhibition of Both Mycelial Growth and Spore Germination of *Fusarium oxysporum* f. sp. *raphani*, Int. J. Mol. Sci., 2013 vol. 14, No. 2, p. 4283-4297, ISSN 1422-0067.

Office action of JP-2016-503694 issued by Japanese Patent Office dated Dec. 12, 2017 (translation).

Directory of Microbicides for the Protection of Materials, A Handbook, Edited by Wilfried Paulus, Springer 2005, pp. 681-682 (10 pages).

* cited by examiner

BIOCIDE FORMULATION AND METHOD FOR TREATING WATER

This application is a national application of PCT-application PCT/FI2014/050216 filed on Mar. 25, 2014, which claims priority of the Finnish national application number FI20135287 filed on Mar. 25, 2013, both of which are incorporated herein by reference.

FIELD OF THE INVENTION

The present invention relates to a biocide formulation comprising a biocide in a micelle. More particularly the micelle comprises a block copolymer and a quaternary ammonium stabilizing compound. The present invention also relates to methods for treating water and controlling biofilms by eliminating microorganisms and/or preventing the growth of microorganisms.

BACKGROUND

Water-intensive processes, such as papermaking and cooling water processes, are offering a fertile environment for microbiological growth. Therefore biocidal treatments are often necessary in various water-intensive processes. A review of paper machine microbiology and common biocides is presented in Chapter 6: Paper machine microbiology, pp. 181-198, by Marko Kolari, in Handbook of Papermaking chemistry 2007, Raimo Alen (Ed.), Finnish Paper Engineers' Association, Helsinki, Finland. The target of biocidal treatments in industry is not always a complete sterilization of process water, but a contribution for finding a stable, dynamic balance in keeping of microbial growth on an acceptable level in cost-efficient manner. The prior art relates to a wide variety of biocides in different kind of applications within water-intensive industries, paper industry being one of the biggest. Commonly used techniques are described for example in U.S. Pat. Nos. 7,285,224 and 6,429,181. It has been estimated that a part of the biocide applications within water-intensive industries are currently using technologies that could be replaced if more effective biofilm-control technology based on targeted biocides could be found.

A biofilm is an aggregate of microorganisms in which cells adhere to each other on a surface. These adherent cells are frequently embedded within a self-produced matrix of extracellular polymeric substance (EPS). Biofilm EPS, which is also referred to as slime, is a polymeric conglomeration generally comprising extracellular polysaccharides, DNA and proteins. Biofilms may form on living or non-living surfaces and can be prevalent in natural, industrial and hospital aqueous settings. The microbial cells growing in a biofilm are generally physiologically distinct from planktonic cells of the same organism, which, by contrast, are single-cells that may float or swim in a liquid medium.

Formation of a biofilm begins with the attachment of free-floating microorganisms to a surface. These first colonists adhere to the surface initially through weak, reversible adhesion via van der Waals forces. If the colonists are not immediately separated from the surface, they can anchor themselves more permanently using cell adhesion structures such as pili. Some species are not able to attach to a surface on their own but are often able to anchor themselves to the EPS matrix or directly to earlier colonists. It is during this colonization that the cells are able to communicate via quorum sensing using signals such as AHL compounds. Once colonization has begun, the biofilm grows through a combination of cell division and recruitment. The final stage of biofilm formation is known as development, and is the stage in which the biofilm is established and may only change in shape and size. The development of a biofilm may allow for an aggregate cell colony (or colonies) to be increasingly resistant to antimicrobial agents.

Biofilms contribute in many problems in aqueous industrial systems, especially in recirculating systems such as paper machines or cooling systems. The build-up of biofilms can cause problems such as unscheduled down-time of the machinery due to cleaning, clogging of pipelines or valves or spray nozzles, poor heat transfer, high energy consumption, corrosion, increased maintenance expenditures, shortened system life, higher operating costs etc.

A biocide is an antimicrobial chemical substance which can deter, render harmless, or exert a controlling effect on any harmful organism. Biocides are commonly used in industry. An antimicrobial biocide may be further classified e.g. as a germicide, an antibacterial, an antiviral, an antifungal, an antiprotozoal or an antiparasite.

Most of the current biocides were originally developed for the control of planktonic bacteria. At the generally used low concentrations these biocides are not very effective against biofilms. The sheath or matrix formed by EPS-producing microorganisms make them to tolerate higher dosages of most of the common biocides. Using higher doses of the biocides may be economically unfeasible or may cause other problems, such as corrosion of the equipment. Also, because biocides are intended to kill living organisms, lifting dosages of biocidal products would also increase risks for health of the personnel working with that particular water-intensive process.

Some biocide formulations described in prior art employ more or less amphiphilic dispersants which fulfill two main functions: a) the wettability of the biofilm for reduction of the biofilm layer (biowettants), or b) the delay and prevention of biofilm growth on surfaces (biostabilizer).

Alternative technologies described in prior art do include, for example, lipid-based bilayer formulations such as liposomes (WO2010/107533) or oil-in-water emulsions of biocides for controlling industrial biofouling (U.S. Pat. No. 6,096,225).

There is a need for better biocides and biocide formulations which can be used against biofilms on surfaces. They should be able to be targeted against the biofilms and also be able to penetrate the biofilm and kill the biofilm organisms. Such biocides should be effective also at low doses.

SUMMARY OF THE INVENTION

The present invention targets to more effective biofilm control by novel biocidal formulations, wherein the biocide solubilization and micelle formation by block copolymers is combined with surface adsorption and membrane permeabilization properties. For this purpose self-assembled mixed micelles are formed, which contain in addition to biocide(s) and block copolymers also membrane permeabilizers and/or cationic polyelectrolytes for improved surface adsorption. This enables a step-change in performance (by factor of about 10), especially when compared to a solvent-based formulation.

The present invention provides a biocide formulation comprising a biocide in a micelle, wherein the micelle comprises a block copolymer having a biocide-solubilizing part and a water-soluble part, and a quaternary ammonium compound which stabilizes the micelle, and also possibly improves the permeabilization properties of the formulation.

The present invention also provides a method for controlling biofilms by eliminating and/or preventing microorganisms in an aqueous environment, comprising providing said biocide formulation, and dosing said biocide formulation to the aqueous environment.

The present invention has advantages over the state-of-the-art by employing additional additives to boost the biocidal performance, i.e. by additional membrane permeabilizers and by improved surface adsorption (e.g. with cationic polyelectrolytes) and enabling thereby step-change performances by synergistic effects. The biocidal performance was shown to be good also in hard water and fiber suspensions.

It is an advantage of the invention that it presents a surprising synergistic biocidal effect between micellar delivery and membrane permeabilization, enabling the reduction of cut-off dosage values (zero viability of planktonic and biofilm cells) even by a factor of 4-20. The biocides can penetrate the biofilm and attack the microorganisms in the biofilm matrix. Despite the potentially higher cost of the formulation compared to known product formulations of the prior art, the cost-performance can be potentially increased by a factor of 2-10. At the same time the use of less biocide improves the environmental impact and reduces health risks for workers exposed to biocides, making this a more sustainable technology.

It is an advantage of the present invention that the biocides may be targeted to biofilms on surfaces.

It is another advantage of the present invention that it can be realized with existing production technology and on basis of commercially available raw materials.

It is another advantage of the present invention that the formulations have sufficient shelf-life. Further, they can be pumped with common industrial chemical pumps.

DETAILED DESCRIPTION OF THE INVENTION

The present invention provides a targeted release of a biocide onto a biofilm surface in an aqueous environment, enabling improved microbe control. In the novel formulation, the biocide solubilization and micelle formation by block copolymers is combined with surface adsorption and membrane permeabilization properties.

One example describes the solubilization of a biocide with low water-solubility (e.g. DBNPA) within a mixed-micelle formed by a) a block copolymer comprising a biocide-solubilizing and a water-soluble block, and b) an additional stabilizer (e.g. DDAC) and/or c) an additional cationic polyelectrolyte (e.g. PDADMAC or PEI) improving surface adsorption and retention of the formulation at surfaces.

In one example the mixed micelles are formed by block copolymers, quaternary ammonium stabilizers and optionally additional cationic polyelectrolytes. The function of the latter is to improve the retention of the biocidal, self-assembled aggregates at surfaces (e.g. steel). In this way the treated surface shows a longer protection time and less microbial contamination even if dosing the biocidal formulation in a non-continuous manner ("shock dosing") meaning that the aqueous phase may at some time point be free of any biocide residuals. Additional additives of the formulation may include also defoamers, deaerators, rheological modifiers, biocide stabilizers or other process chemicals.

The present invention provides a biocide formulation comprising a biocide (or a mixture of biocides) in a micelle, wherein the micelle comprises a block copolymer having a biocide-solubilizing part and a water-soluble part, and a quaternary-ammonium stabilizing compound. In addition to these active ingredients the formulations may contain other ingredients, such as stabilizing agents of the active ingredients and residual or trace amounts of other agents, such as salts, citrate, preservative agents, solvents etc.

Micelles are aggregates of amphiphilic molecules dispersed in a liquid medium. A typical micelle in aqueous solution is an aggregate, which hydrophilic moieties are in contact with surrounding solvent, sequestering the hydrophobic moieties in the micelle's center. The micellar phase formation occurs by packing the hydrophobic molecular entities in a fashion, which generates interfacial curvature. In this way spherical, cylindrical or disc like discrete aggregates are formed. Normal phase micelles (oil-in-water micelle) have the hydrophobic moieties in the center of the micelle and the hydrophilic groups at the micellar interface. Inverse micelles have the head groups at the center with the tails extending out (water-in-oil micelle). Micelles are typically approximately spherical in shape. Other micellar phases, including shapes such as ellipsoids, cylinders, and bilayers, are also possible. The shape and size of a micelle is a function of the molecular geometry of its surfactant molecules and solution conditions such as surfactant concentration, temperature, pH, and ionic strength. The process of forming micelles is known as micellisation and forms part of the phase behavior of many lipids and other amphiphilic molecules according to their polymorphism. Micelles in lipid-water systems are further discussed for example by J. M. Seddon and R. H. Templer in "Polymorphism of Lipid-Water Systems", from the Handbook of Biological Physics, Vol. 1, ed. R. Lipowsky, and E. Sackmann. (c) 1995, Elsevier Science B.V. ISBN 0-444-81975-4.

Micelles form spontaneously in water, and this spontaneous aggregation is due to the amphiphilic nature of the micelle forming molecules. The attractive interaction of their hydrophobic entities is the basis of their aggregation. When the hydrophobic tails are not sequestered from water, the result is the formation of an organized cage around the hydrophobic tail and the entropy change is unfavorable. However, when the amphiphilic molecules form micelles, the hydrophobic tails interact with each other and this interaction releases water from the hydrophobic tails, leading to a favorable increase in entropy. Due to the spontaneous formation of the micelles, the simplest way to prepare the biocide formulation of the invention is to mix the ingredients and let the micelles form.

Micelles only form when the concentration of surfactant is greater than the critical micelle concentration (CMC). The surfactant is any surface active material that can part the surface upon entering. The CMC is the concentration above surfactant when micelles will form spontaneously. The higher the concentration, the more micelles there are. Micelle formation also depends on the Krafft temperature. This temperature is when surfactants will form micelles. If the temperature is below the Krafft temperature, then there is no spontaneous formation of micelles. As the temperature increases, the surfactant will turn into a soluble form and will be able to form micelles from a crystalline state.

The size of the micelles useful in the present invention may be in the range of about 5-30 nm, such as about 5-20 nm, for example 5-15 nm. Generally the average size of the micelles is about 10 nm. Such micelles may also be called nanoparticles or nanospheres, which generally refer to roughly spherical shaped units that self-assemble under the appropriate conditions from an amphiphilic material so that the core is hydrophobic and the corona is hydrophilic. The micelles may be in a form of a nanoemulsion or nanosuspensions in the aqueous solution. Such nanoemulsions may be capable of crossing biological barriers, such as microbial membranes. Possible pathways include for example phagocytosis, pinocytosis and endocytosis.

The biocide may be any suitable biocide (antimicrobial agent) able to kill the microorganisms, such as the biofilm-forming microorganisms. In one embodiment the biocide is present as a mixture of two or more different biocides. The biocide may be soluble to water, or it may have low solubility to water or it may even be non-water-soluble. It is advantageous that the biocide does not react with compounds of the micelle, and the formulation as whole is stable. Generally the biocide formulation contains at least 2% (w/w) of the biocide (antimicrobial agent). In one embodiment the biocide formulation contains about 5-50% (w/w) of the biocide. In one embodiment the biocide formulation contains about 10-25% (w/w) of the biocide. In one embodiment the biocide formulation contains about 15-25% (w/w) of the biocide. In one embodiment the biocide formulation contains about 13-17% (w/w) of the biocide. In one specific embodiment the biocide formulation contains about 15% (w/w) of the biocide.

The terms "water insoluble" or a compound having "low water solubility", as used herein, refers to compounds having low, including very low water solubility. The low solubility may be for example a solubility of at about 1 gram per 100 grams of water, such as about 10 grams per 100 grams of water, or about 50 grams per 100 grams of water.

The biocides may be generally divided into two categorical groups: oxidizing and non-oxidizing (or conventional) biocides. The non-oxidizing biocides include biocides such as DNBPA, glutaraldehyde, isothiazolones etc. One example of suitable biocides for use in the formulations of the invention includes non-oxidizing biocides. The biocides may also be divided into groups by function mechanisms. The electrophiles include oxidants, such as halogens and peroxy compounds, and electrophiles, such as formaldehyde, formaldehyde-releasers, isothiazolones, Bronopol and Cu, Hg and Ag. The membrane active biocides include lytic biocides, such as quats, biguanides, phenols and alcohols, and protonophores, such as parabens, weak acids and pyrithiones.

Examples of non-oxidizing biocides include glutaraldehyde, 2,2-dibromo-3-nitrilopropionamide (DBNPA), 2-bromo-2-nitropropane-1,3-diol (Bronopol), 5-chloro-2-methyl-4-isothiazolin-3-one (CMIT), 2-methyl-4-isothiazolin-3-one (MIT), a mixture of CMIT and MIT, 1,2-dibromo-2,4-dicyanobutane, bis(trichloromethyl)sulfone, 2-bromo-2-nitrostyrene, 4,5-dichloro-1,2-dithiol-3-one, 2-n-octyl-4-isothiazolin-3-one, 1,2-benzisothiazolin-3-one, ortho-phthalaldehyde, guanidines, biguanidines, pyrithiones, carbamates, 3-iodopropynyl-N-butylcarbamate, phosphonium salts such as tetrakis hydroxymethyl phosphonium sulfate (THPS), 3,5-dimethyl-1,3,5-thiadiazinane-2-thione (Dazomet), 2-(thiocyanomethylthio) benzothiazole, methylene bisthiocyanate (MBT), and combinations thereof.

Preferred non-oxidizing biocides include glutaraldehyde; 2,2-dibromo-3-nitrilopropionamide (DBNPA); 5-chloro-2-methyl-4-isothiazolin-3-one (CMIT); 2-methyl-4-isothiazolin-3-one (MIT); a mixture of CMIT and MIT; carbamates; and phosphonium salts such as tetrakis hydroxymethyl phosphonium sulfate (THPS), 3,5-dimethyl-1,3,5-thiadiazinane-2-thione (Dazomet), 2-(thiocyanomethylthio) benzothiazole, methylene bisthiocyanate (MBT), and combinations thereof. The advantage in using these biocides is in that they are commonly used within the pulp and paper industry, and their behavior is well known.

In one embodiment the non-oxidizing biocides are selected from the group consisting of glutaraldehyde, 2,2-dibromo-3-nitrilopropionamide (DBNPA), 5-chloro-2-methyl-4-isothiazolin-3-one (CMIT), 2-methyl-4-isothiazolin-3-one (MIT), and a mixture of CMIT and MIT. These biocides have a favourable speed of kill and they provide a preferred mode of action. Moreover, the required amounts are reasonably low thus rendering the costs affordable.

Examples of oxidizing biocides include chlorine, alkali and alkaline earth hypochlorite salts, hypochlorous acid, chlorinated isocyanurates, bromine, alkali and alkaline earth hypobromite salts, hypobromous acid, bromine chloride, chlorine dioxide, ozone, hydrogen peroxide, peroxy compounds, such as peracetic acid, performic acid, percarbonate or persulfate salts, halogenated hydantoins, e.g., monohalodimethylhydantoins such as monochlorodimethylhydantoin, or dihalodimethylhydantoins such as chlorobromodimethylhydantoin, monochloramines, monobromamines, dihaloamines, trihaloamines, active halogen compounds reacted with other nitrogenous compounds such as urea, and combinations thereof.

Most common types of non-oxidizing biocides being used in the pulp and paper making processes include 2-bromo-2-nitropropane-1,3-diol, 5-chloro-2-methyl-4-isothiazolin-3-one, DBNPA, n-octyl-isothiazolin-3-one, MBT, quaternary ammonium compounds, THPS and glutaraldehyde.

In one embodiment the biocide is 2,2-dibromo-2-cyanoacetamide (also called as 2,2-dibromo-3-nitrilopropionamide or dibromonitrilopropionamide, DBNPA), which is a white crystalline powder having melting point of 124.5° C., water solubility about 15000 mg/l at 20° C. and vapor pressure 9.00 E-4 mm of Hg at 20° C. DBNPA hydrolyzes easily under both acidic and alkaline conditions. Although DBNPA is compatible with many chemical classes, including oxidizing agents, it will react readily with nucleophilic agents and sulfur-containing reducing agents. DBNPA is a non-oxidizing biocide and it is not a bromine release biocide. DBNPA does act similar to the typical halogen biocides. The reaction of DBNPA with sulfur-containing nucleophiles common to microorganisms, such as glutathione or cysteine, is the basis of its mode of antimicrobial action. Unlike other thiol-reactive biocides, its action is such that thiol-based amino acids, such as cysteine, are oxidized beyond the formation of disulfide species. This reaction irreversibly disrupts the function of cell-surface components, interrupting transport across cell membranes, and inhibiting key biological functions.

The micelle comprises a block copolymer having a biocide-solubilizing part (or moiety) and a water-soluble part (or moiety). The biocide-solubilizing part may be a fat-soluble part or a non-water-soluble part. Poloxamers in general may be used (available for example by trade names Pluronic or Kolliphor). Poloxamers are nonionic triblock copolymers composed of a central hydrophobic chain of polyoxypropylene (poly(propylene oxide)) flanked by two hydrophilic chains of polyoxyethylene (poly(ethylene oxide)). In some cases the block copolymer may also be called a solubilizer. In one embodiment the block copolymer is poly(ethylene oxide)-poly(propylene oxide) (PEO-PPO) block copolymer. The content of the block copolymer in the formulation may be from 15 to 50% (w/w).

In one embodiment the content of the block copolymer in the formulation may be in the range of about 15-30% (w/w), such as about 20-25% (w/w). Especially at low or moderate storage temperatures (<30° C.) it is convenient to use a lower amount of the block copolymer, and yet an enhanced efficacy compared to the solvent based system is obtained.

In another embodiment the content of the block copolymer in the formulation is higher, preferably from 30 to 50% (w/w), especially when enhanced temperature (>30° C.) stability is required. More preferably the content of the block copolymer is from 30 to 45% (w/w), most preferably from 34 to 40% (w/w), providing excellent stability and clearly enhanced efficacy. The upper limit of the range is restricted in order to optimize the cost of the polymer.

The quaternary ammonium stabilizing compound (or "stabilizer") may be for example a quaternary ammonium cation, also known as quats. They are positively charged polyatomic ions of the structure $NR_4^+$, R being an alkyl group or an aryl group. Unlike the ammonium ion ($NH_4^+$) and the primary, secondary, or tertiary ammonium cations, the quaternary ammonium cations are permanently charged, independent of the pH of their solution. Quaternary ammonium salts or quaternary ammonium compounds (called quaternary amines in oilfield parlance) are salts of quaternary ammonium cations with an anion.

In one embodiment of the present invention, the quaternary ammonium stabilizing compound may show also permeabilizing properties, and thus it may have a dual-effect.

The quaternary ammonium stabilizing compound may be selected for example from n-alkyl dimethyl benzyl ammonium chloride, alkenyl dimethylethyl ammonium chloride, didecyl dimethyl ammonium chloride (or N,N-didecyl-N,N-dimethyl ammonium chloride, DDAC, available for example by trade name Bardac-22) and dimethyl dioctadecyl ammonium bromide (DDAB).

The content of the quaternary ammonium stabilizing compound in the formulation may be in the range of about 5-30% (w/w), such as about 5-10% (w/w).

The biocide formulation may further comprise a membrane permeabilizer such as cationic polyelectrolytes or chelating agents. In one embodiment the cationic polyelectrolyte is selected from poly(diallyldimethylammonium chloride) (PDADMAC) and polyethyleneimine (PEI, available for example by trade name Retaminol®), polyetheramines (for example polyether diamine or polyether triamine, available for example by trade name Jeffamine), or polyamines, such as spermidine and spermine. The content of the cationic polyelectrolyte membrane permeabilizer in the formulation may be in the range of 0.5-5% (w/w).

Provided that the membrane permeabilizer is present in the biocide formulation of the present invention, it should not be the same compound as the quaternary ammonium stabilizing compound.

In one embodiment the chelating agents are selected from the group comprising polyaminopolycarboxylic acids such as TTHA (triethylenetetramine-N,N,N',N'',N''',N'''-hexa acetic acid, EDTA (ethylenediaminetetraacetic acid), DTPA (diethylenetriaminepentaacetic acid), HEDTA (N-(hydroxyethyl)-ethylenediaminetriacetic acid), EDDS (ethylenediaminedisuccinic acid); polyaminopolymethylene phosphonic acids such as DTPMPA (diethylenetriamine-pentakis methylene-phosphonic acid), TTHMPA (triethylenetriamine-heksakis methylenephosphonic acid), EDTMPA (ethylenediaminetetra(methylene phosphonic acid); and AES (N-bis[2-(1,2-dicarboxy-ethoxy)ethyl]aspartic acid). Most preferably the chelating agent is DTPA.

Polydiallyldimethylammonium chloride (polyDADMAC or polyDDA) is a homopolymer of diallyldimethylammonium chloride (DADMAC). The molecular weight of polyDADMAC is typically in the range of hundreds of thousands of grams per mole, and even up to a million for some products. PolyDADMAC is usually delivered as a liquid concentrate having a solids level in the range of 10 to 50%. It is a high charge density cationic polymer.

Polyethyleneimine is a cationic polymer, which can be linear containing all secondary amines, or branched containing primary, secondary or tertiary amino groups.

The membrane permeabilizer may also be a surfactant. Surfactants are usually organic compounds that are amphiphilic, meaning they contain both hydrophobic groups (their tails) and hydrophilic groups (their heads). Therefore, a surfactant contains both a water-insoluble (or oil soluble) component and a water-soluble component. Surfactants will diffuse in water and adsorb at interfaces between air and water or at the interface between oil and water, in the case where water is mixed with oil. The insoluble hydrophobic group may extend out of the bulk water phase, into the air or into the oil phase, while the water soluble head group remains in the water phase. This alignment of surfactants at the surface modifies the surface properties of water at the water/air or water/oil interface.

In one embodiment the biocide formulation further comprises a defoamer. Defoamer (defoaming agent) is a substance generally used to reduce foaming due to gases, nitrogenous materials or proteins, which may interfere with processing. General examples of defoamers include long chain fatty alcohols, organic phosphates, silicone fluid etc.

In one embodiment the biocide formulation contains about 15-23% (w/w) of the biocide, such as DBNPA, about 15-25% (w/w) of the block copolymer, such as poloxamer, about 5-30% (w/w) of the quaternary ammonium stabilizing compound, such as DDAC. Optionally the biocide formulation may further contain 1-5% (w/w) of membrane permeabilizer. In one embodiment the biocide formulation further contains a small amount of citrate, such as about 0.2% (w/w), which may stabilize the active ingredients. In one specific embodiment the biocide formulation contains about 15% (w/w) of DBNPA as the biocide, about 15-25% (w/w) of PEO-PPO as the block copolymer, and about 20-30% (w/w) of DDAC as the quaternary ammonium stabilizing compound. The percentages used herein generally refer to the total content of the biocide formulation as a whole, unless otherwise indicated.

The formulation may be present as an emulsion or emulsion concentrate, which may contain water in the range of 40-50% (w/w) of the total content of the emulsion. In one example the addition of the cationic or another water-soluble polymer leads to the formation of a water-in-water emulsion, comprising the micellar solution of the biocides.

In one embodiment the biocide formulation is present as a two-component formulation comprising a first component comprising the membrane permeabilizer and a second component comprising the biocide, the block copolymer and the quaternary ammonium stabilizing compound. The second component is generally present as a mixture of the ingredients. The first component and/or the second component may contain also further ingredients, such as stabilizing agents of the active ingredients and residual or trace amounts of other agents, such as salts, citrate, preservative agents, solvents etc. The first component and the second component are arranged to be combined to obtain the final biocide formulation prior adding or dosing to the aqueous environment.

The present invention also provides a method for targeting a biocide onto a biofilm surface in an aqueous environment, comprising providing the biocide formulation, and contacting said biofilm surface with said biocide formulation. The surface may be for example a plastic, ceramic, or a metal surface, such as steel, stainless steel, or copper surface. Generally the colonization by biofilm bacteria is greatest on plastic surfaces and least on copper surfaces. The targeting may also include controlled release and/or delivery of the biocide leading to improved uptake of the biocide to the microbe by membrane permeabilization.

The present invention also provides methods for treating water, comprising providing said biocide formulation, and adding or dosing said biocide formulation to the water. The methods aim for eliminating and/or preventing biofilm formation on surfaces to clean and/or remove the forming or already formed slimes or biofilms. "Dosing" generally refers to adding or feeding chemicals in quantities into a process fluid continuously or at intervals to give sufficient time for the chemical to react or show the results.

The biocide formulation as used in the methods described herein may be added or dosed to the water to be treated in biostatic or biocidal amounts. Biostatic amount refers to an amount sufficient to at least inhibit the activity and/or growth of the microbes or the biofilm. Biocidal amount refers to more effective activity, such as to an amount capable of killing most or all of the microbes.

The present invention also provides a method for controlling biofilms by eliminating microorganisms and/or preventing the growth thereof in an aqueous environment, comprising providing the biocide formulation, and adding or dosing said biocide formulation to the aqueous environment. The "aqueous environment" as used herein refers to a water system, such as an industrial water system, containing aqueous solution. The eliminating and/or preventing refer to any biostatic or biocidal effect, such as killing, reducing, removing, or inhibiting the growth of, or inactivating or cleaning the biofilm. The elimination may be total or partial. The prevention refers to any preventive eliminating action which reduces or inhibits the growth of the microorganisms and thereby totally or partially prevents the formation of the biofilm.

The present invention also provides the use of said biocide formulation for controlling (for example eliminating, inactivating and/or preventing) biofilms or microorganisms in aqueous processes. In one embodiment the microorganisms are in a form of a biofilm. This results in a synergy in controlling of attached microorganism (biofilms) on surfaces.

The present invention also provides the use of additional cationic polyelectrolytes for retention of the biocidal formulation (e.g. micelles) at surfaces (e.g. steel surfaces of a pipeline or tank for process water) and thereby gaining a prolonged protection.

"Aqueous solution" as used herein refers to any solution containing water. Said aqueous solution is generally any solution containing sufficient amount of water phase to be used in the current application. Said aqueous solution may be for example water, surface water, ground water, waste water, industrial water, industrial raw water, sludge or solids suspension, pulp suspension or any other suitable aqueous solution.

The aqueous environment may be an industrial process, such as a water treatment process. The industrial process may be selected from processes such as wood pulp, paper, board, industrial wastewater treatment, oil drilling, machine tool industry, oils cutting tools, hydraulics, etc. and the equipment used in such processes. The application target may be for example any industrial water system, which generally means an engineered recirculating water system, such as papermaking system, cooling water systems (e.g. cooling towers, open and closed loop cooling units), industrial raw water systems, drinking water distribution systems, sanitizing drinking water system, oil production or recovery systems (oil field water system, drilling fluids), fuel storage system, metal working systems, heat exchangers, reactors, equipment used for storing and handling liquids, boilers and related steam generating units, radiators, flash evaporating units, refrigeration units, reverse osmosis equipment, gas scrubbing units, blast furnaces, sugar evaporating units, steam power plants, geothermal units, nuclear cooling units, water treatment units, pool recirculating units, mining circuits, closed loop heating units, machining fluids used in operations such as for example drilling, boring, milling, reaming, drawing, broaching, turning, cutting, sewing, grinding, thread cutting, shaping, spinning and rolling, hydraulic fluids, cooling fluids, and the like.

The biocide formulation may be added to the circulating water of a pulp, paper or cardboard machine. In one example the biocide formulation is added or dosed to a pulp and/or paper processing system. The formulation may be generally utilized throughout the system to minimize and to prevent biofilm formation on the system surfaces. The formulation may be added at almost any point in the system to generally maintain microbe control throughout the system. In certain examples the formulation is added in the short water loop of the system. Other examples of suitable adding points are large storage towers for process water (circulating water towers, filtrate water towers), clear or cloudy filtrate storage tanks, pulpers or process streams upstream/downstream of the pulpers, broke system or process streams upstream/downstream of vessels therein, couch pit process streams upstream/downstream of the couch pit, water recovery section, wire pit process streams upstream/downstream of the pit, paper machine blend chest process streams upstream/downstream of the chest, and shower water tank process streams upstream/downstream of the tank.

In one embodiment the formulation is added or dosed to industrial raw water, which is generally incoming water which may be untreated or clarified natural water originated from surface waters, such as rivers or lakes.

The formulation of the invention may be added as a solid, such as dry powder, or in a liquid form to the liquid or water to be treated. It may be dosed continuously or periodically as a batch process. Examples of suitable concentrations to be used in the processes are about 0.3-50 ppm, more particularly 0.35-10 ppm, such as 1-5 ppm. In batch process the formulation may be fed for about 3-45 minutes each about 6-24 times a day, or for example for about 10-30 minutes for about 12-24 times a day.

Favourably, the present invention provides a synergistic biocidal effect between micellar delivery and membrane permeabilization, enabling the reduction of cut-off dosage values (i.e. zero viability of planktonic and biofilm cells) by a factor of 1-20, preferably in the range of 4-10.

Despite the potentially higher cost of the formulation compared to current product formulations the cost-performance can be potentially increased by a factor of 2-10. At the same time the use of less biocide improves the environmental impact and makes this a more sustainable technology.

Next the invention will be described in detail with reference to the following non-limiting examples.

EXAMPLES

All biofilm inactivation/killing experiments shown in this document were conducted by following a same test method that is described herein: Biofilm-forming bacteria (strains of *Deinococcus, Meiothermus* and *Pseudoxanthomonas* genus) were grown at +50° C. in commercial R2 liquid growth media. 1 ml of this microbial suspension was used for inoculating sterile R2A agar plates covered by sterile filter papers. The test organisms were grown on these agar plates covered with filter papers for 1 d. Round stainless steel coupons were mounted on filter paper and incubated for 6 d at +50° C. During this incubation biofilms were formed on the steel coupons. Each coupon was detached from filter paper and inserted into test chamber, each filled with 100 ml of municipal tap water adjusted at pH 8 and to +50° C. Biocide formulations were applied to each chamber according to test plan, always with three replicate chambers. Chambers without any biocide and chambers with a commercial reference biocide were always included. At the end of the exposure period efficacies of the tested biocide formulations were quantified by making bacterial cultivations with standard plate count methods from the chamber liquid (=performance against planktonic, free-floating cells) and from stainless steel surfaces by swabbing samples (=performance against biofilm).

Experiments shown herein used as a commercial reference biocide a Fennosan R20V product (Kemira, Finland). It is a 20% solution of free DBNPA in polyethylene glycol as solvent. In the new biocide formulations shown herein, the name "Pluronic" followed with different numbers is referring to different grades of PEO-PPO block copolymers from BASF GmbH. "Bardac-22" refers to a DDAC product from Lonza Inc. "Retaminol" is a commercial tradename for a PEI, polyethyleneimine product (Kemira).

Example 1

Comparison of Different Biocide Compositions

Figure 1:
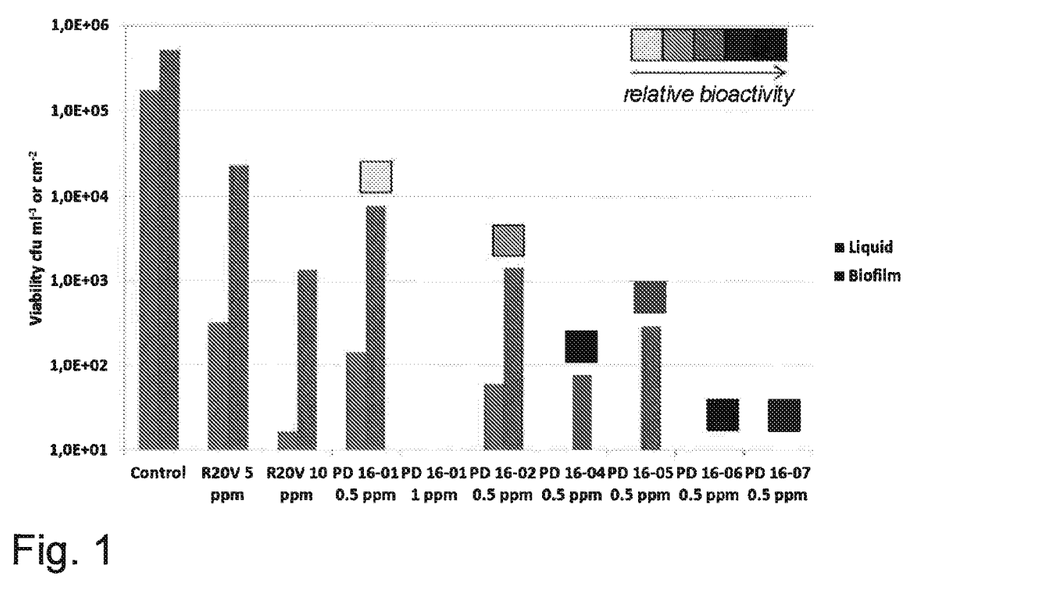
FIG. 1 shows results of biofilm inactivation/killing experiment comparing commercial DBNPA-containing biocide (R20V) to novel formulations according to the invention (PD16-01 to PD16-07). All concentrations are indicated as mg/l (ppm) of DBNPA.

This study was performed for comparing the biocidal performance of different biocidal compositions against bacterial cells in biofilm and in liquid. The reference biocide was a commercial DBNPA-containing product (R20V). It was compared to different novel formulations, all having DBNPA as the biocidal active agent in them. All dosages are shown as the dosage of biocidal active agent DBNPA (mg/l, ppm). The biofilm test was executed as explained above. Results in FIG. 1 show that 10 ppm of DBNPA showed good killing efficacy of planktonic cells when dosed in the form of R20V product (=free DBNPA). However, at this dosage the efficacy against biofilm was not as strong. The novel micellar formulations (PD16-01 to PD16-07) started to show a strong effect against planktonic and biofilm cells already at dosage level of 1 ppm or less (ppm's on basis of the DBNPA content). The novel formulations were thus capable of improving biofilm control performance up to ten times. All novel formulations were having DBNPA content of 25% but with varying Pluronic F68 content (from 20% to 30%) and varying Bardac-22 content (from 10% to 30%). The best performing formulation PD16-06 contained 25% of DBNPA, 20% of Pluronic and 20% of Bardac-22. The results demonstrated that these novel formulations have a clear benefit in form of increased biofilm inactivation/killing.

Example 2

Comparison of Different Biocide Compositions

This study was performed for two reasons. Firstly, to evaluate the impact of PEI addition on the performance of the novel biocide formulations. Secondly, mixtures were prepared to evaluate the relative impact of different components. The compositions are shown in Table 1.

TABLE 1

Sample series PD-22.

| Sample code | Fennosan R20 | Pluronic F68 | Milli-Q water (+ citric acid) | DBNPA | Bardac-22 (50% DDAC) | Retaminol | "Name" of the composition: |
|---|---|---|---|---|---|---|---|
| PD22-01 | | 1.88 g (18.8%) | 3.07 g (30.7%) | 2.5 g (25%) | 2.25 g (25%) | 0.3 g (3%) | GMC |
| PD22-02 | | 1.88 g (18.8%) | 8.12 g (81.2%) | | | | Pluronic |
| PD22-03 | | | 5.25 g (52.5%) | 2.5 g (25%) | 2.25 g (22.5%) | | DDAC + DBNPA [1] |
| PD22-04 | | | 9.7 g (97%) | | | 0.3 g (3%) | PEI |
| PD22-05 | | 1.88 g (18.8%) | 5.87 g (58.7%) | | 2.25 g (22.5%) | | DDAC + Pluronic |
| PD22-06 | 7.75 g (77.5%) | | | | 2.25 g (22.5%) | | R20 + DDAC |

[1] Incomplete solubilization of DBNPA when mixed with DDAC was observed and it was excluded from the biofilm test.

Figure 2:
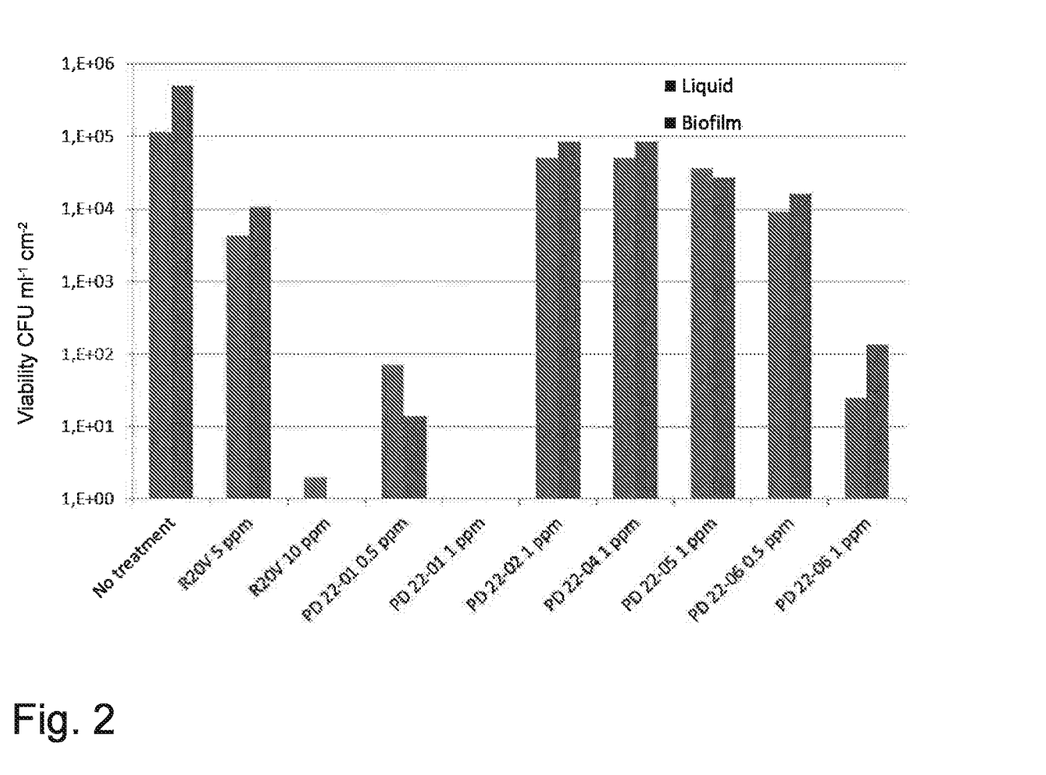
FIG. 2 shows results of biofilm inactivation/killing experiment comparing commercial DBNPA-containing biocide (R20V) to novel formulation according to the invention (PD22-01) and other formulations.

The biofilm test was executed as explained above. Results in FIG. 2 show that 5 ppm of DBNPA had very weak killing efficacy and 10 ppm of DBNPA was needed for a strong killing efficacy, when DBNPA was dosed in the form of R20V product (=free DBNPA). Formulation PD22-01 ("GMC") showed a very strong killing efficacy at 0.5 ppm and yielded total sterilization at 1.0 ppm dosage. This demonstrates that the micellar DBNPA formulation with stabilizing quaternary ammonium compound and PEI as permeabilizer component was highly effective. This composition according to invention was showing over ten times efficacy improvement when compared to R20V reference. PD22-02 ("Pluronic") had no clear killing effect, demonstrating that the PEO-PPO block copolymer alone was not effective. PD22-03 ("DBNPA+DDAC") mixture did not solubilize and could not be tested. PD22-04 ("PEI") had no clear killing effect, demonstrating that the cationic PEI polymer alone was not effective. PD22-05 ("DDAC+Pluronic") showed only a very small killing effect (about 0.5 log reduction in bacterial amounts) demonstrating that the PEO-PPO block copolymer with quaternary ammonium compound, but without DBNPA was not really effective. PD22-06 ("R20V+DDAC") showed that free DBNPA with high relative dose of quaternary ammonium compound DDAC was having a clear biocidal effect. However, higher dosage was required compared to the composition according this invention ("GMC", PD22-01). In addition the "GMC" was relatively better in biofilm killing/inactivation.

These results demonstrate that the composition of the present invention has killing performance beyond the individual components of the composition. It was also observed that the "CMC" formulation showed storage stability of at least 18 weeks without any phase separations or color changes.

Example 3

Permeabilization Study

Figure 3:
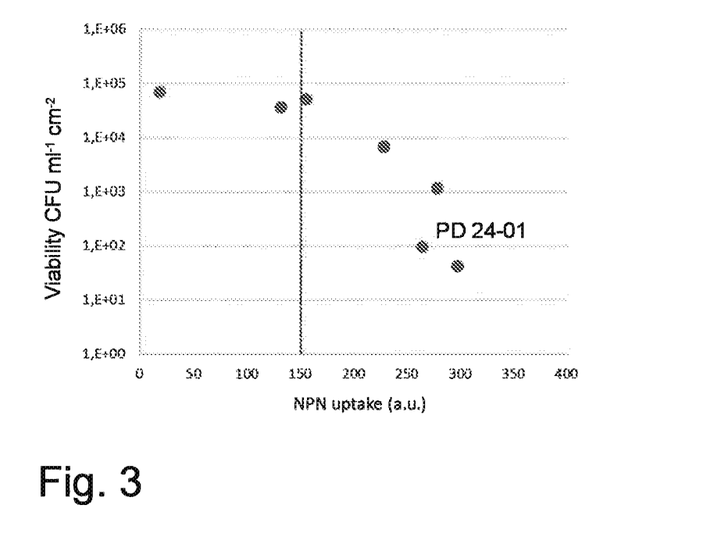
FIG. 3 shows plot of results from two tests, showing bacterial viability results for Pluronic+DBNPA formulations with a varying DDAC concentration (Biofilm killing/inactivation test), versus membrane permeabilization (NPN uptake test) of the similar formulations without DBNPA.

Biofilm killing/inactivation tests were conducted with micellar Pluronic+DBNPA formulations, all with 9% DBNPA content, but with a varying DDAC content. The killing efficacy was measured. In addition, a membrane permeabilization study was executed with the known "NPN uptake method" (Hancock & Wong. AAC. Vol. 26, No. 1:48-52. July, 1984; Alakomi et al., Weakening Effect of Cell Permeabilizers on Gram-Negative Bacteria Causing Biodeterioration, Appl Environ Microbiol. 2006 July; 72(7): 4695-4703) using cells of *Pseudomonas aeruginosa* bacteria as model organism. In this method fluorescence is measured after 1-N-phenylnaphthylamine (NPN) uptake due to membrane permeabilization. The membrane permeabilizing effect of the quaternary ammonium compound DDAC was studied by using similar formulations as in the biofilm killing test but excluding the DBNPA. FIG. 3 shows the plotted results from these two studies. Those DDAC-containing formulations that gave the strongest response regarding NPN uptake (strongest permeabilization) gave also the best synergistic amplification of DBNPA's biocidal activity when used for making of the micellar Pluronic+DBNPA+DDAC formulations. One of the best performing compositions contained DBNPA 9%, Pluronic 27%, DDAC 4.5% and PEI 2.3% (PD24-01). The biocidal activity increased strongly along the membrane permeabilizing properties of the formulations, confirming that the quaternary ammonium compound as a part of the micellar Pluronic+DBNPA formulation provides the inventive composition with improved killing efficacy.

Example 4

Comparison of Stability and Biocidal Efficacy of Different Biocide Compositions This study was performed in order to compare stability and killing efficacy of different biocidal compositions. Stability was visually followed at +25° C. and +45° C., for five weeks.

Biocidal compositions were initially homogeneous and colorless; phase formation and/or yellowish color were regarded as poor stability. Stability and compositions of the formulations are shown in Table 2.

Figure 4:
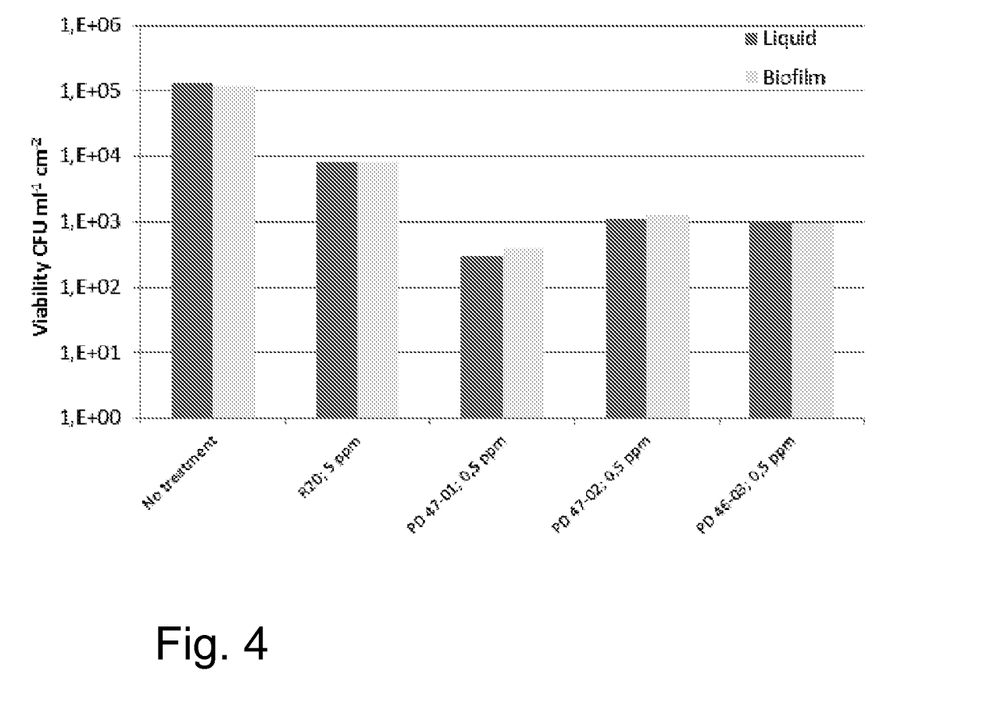
FIG. 4 shows the results of biocidal killing efficacy of formulations shown in Table 2. The biocidal killing efficacy of PD 46-03 (<30% block copolymer) at 0.5 ppm, and both of PD 47-01 and PD 47-02 (>30% block copolymer content) at 0.5 ppm were remarkably better compared to Fennosan R20 (a solvent based DBNPA product) at 5 ppm.

The biocidal killing efficacy of the formulations was analyzed by using the above mentioned test method. Results are shown in FIG. 4.

TABLE 2

Compositions and stability of sample series PD 46, PD 47 and PD 48

| Sample code | Fennosan R20 | Block copolymer * | Milli-Q water (+ citric acid) | DBNPA | DDAC | Stability at +25° C. | Stability at +45° C. |
|---|---|---|---|---|---|---|---|
| PD 47-01 |  | 40% | 29% | 20% | 11% | >35 d | >35 d |
| PD 47-02 |  | 34% | 36% | 20% | 10% | 19 d | 9 d |
| PD 46-03 |  | 28% | 42% | 20% | 8% | 7 d | 1 d |
| PD 48-01 |  | 26% | 46% | 20% | 8% | 7 d | <1 d |
| PD 48-03 |  | 24% | 49% | 20% | 7% | 7 d | <1 d |
| PD 48-05 |  | 23% | 50% | 20% | 7% | 7 d | <1 d |
| R20 | 100% |  |  |  |  | >35 d | >35 d |

* block copolymer was Pluronic L35, L64, PE6800 or PE3500

Table 2 shows that biocidal compositions with low (<30%) block copolymer and low (<10%) DDAC content, but with high (>40%) water content, suffered stability problems, especially at +45° C. storage. On the contrary, excellent stability was obtained with those compositions containing high (>30%) block copolymer and high (>10%) DDAC, but low (<40%) water concentration.

FIG. 4 shows that biocidal killing efficacy of PD 46-03 (<30% block copolymer) at 0.5 ppm, and both PD 47-01 and PD 47-02 (>30% block copolymer content) at 0.5 ppm were remarkably better than of Fennosan R20 (a solvent based DBNPA product) at 5 ppm.

Obtained results thus indicate that all tested novel micellar biocide compositions with over 20% block copolymer composition were more effective than solvent-based DBNPA (Fennosan R20). Moreover, all formulations showed several days of stability at +25° C. Increased temperature stability was obtained with high (>30%) block copolymer, high (>10%) DDAC and low (<40%) water content. This is beneficial for certain industrial applications.

The invention claimed is:

1. A biocide formulation comprising a biocide in a micelle, wherein the micelle comprises:
   a block copolymer wherein the block copolymer is a poloxamer, and
   a quaternary ammonium stabilizing compound wherein the quaternary ammonium stabilizing compound is selected the group consisting of n-alkyl dimethyl benzyl ammonium chloride, alkenyl dimethylethyl ammonium chloride, didecyldimethylammonium chloride (DDAC) and dimethyldioctadecylammonium bromide (DDAB),
   wherein the biocide is selected from the group consisting of 2,2-dibromo-3-nitrilopropionamide (DBNPA) and 2-bromo-2-nitropropane-1,3-diol.

2. The biocide formulation of claim 1, further comprising a membrane permeabilizer, wherein the membrane permeabilizer comprises a chelating agent or a cationic polyelectrolyte or both,
   wherein the cationic polyelectrolyte is selected from the group consisting of poly(diallyldimethylammonium chloride) (PDADMAC), polyethyleneimine (PEI), polyetheramines and polyamines.

3. The biocide formulation of claim 2, wherein it is present as a two-component formulation comprising a first component comprising the membrane permeabilizer and a second component comprising the biocide, the block copolymer and the quaternary ammonium stabilizing compound wherein the first component and the second component are arranged to be combined prior adding or dosing to an aqueous environment.

4. The biocide formulation of claim 1, comprising about 10-25% (w/w) of the biocide.

5. The biocide formulation of claim 1, comprising from 15 to 50% (w/w) of the block copolymer.

6. The biocide formulation of claim 1, comprising about 5-30% (w/w) of the quaternary ammonium stabilizing compound.

7. A method for controlling biofilms by eliminating and/or preventing microorganisms in an aqueous environment, wherein the method comprises providing the biocide formulation of claim 1, and dosing said biocide formulation to the aqueous environment.

8. The method of claim 7, wherein the aqueous environment is an industrial water system.

9. The method of claim 8, wherein the industrial water system is selected from papermaking systems, cooling water systems including cooling towers, open and closed loop cooling units, industrial raw water systems, drinking water distribution systems, sanitizing drinking water system, oil production or recovery systems including oil field water systems, drilling fluids, fuel storage systems, metal working systems, heat exchangers, reactors, equipment used for storing and handling liquids, boilers including steam generating units, radiators, flash evaporating units, refrigeration units, reverse osmosis equipment, gas scrubbing units, blast furnaces, sugar evaporating units, steam power plants, geothermal units, nuclear cooling units, water treatment units, pool recirculating units, mining circuits, closed loop heating units, machining fluids used in operations including drilling, boring, milling, reaming, drawing, broaching, turning, cutting, sewing, grinding, thread cutting, shaping, spinning and rolling, hydraulic fluids, and cooling fluids.

10. The method of claim 8, wherein the industrial water system is selected from circulating water of a pulp, paper or cardboard machine, and industrial raw water.

11. The method of claim 7, wherein the biocide formulation is dosed to a concentration of 0.3-50 ppm.

12. The method of claim 11, wherein the biocide formulation is dosed to a concentration of 1-5 ppm.

* * * * *